(12) United States Patent
Hecht

(10) Patent No.: US 6,805,449 B2
(45) Date of Patent: *Oct. 19, 2004

(54) PRESENTATION IMAGING SYSTEM

(75) Inventor: Kurt Hecht, Buckingham, PA (US)

(73) Assignee: Accu-Sort Systems, Inc., Hatfield, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/695,175

(22) Filed: Oct. 28, 2003

(65) Prior Publication Data

US 2004/0085521 A1 May 6, 2004

Related U.S. Application Data

(63) Continuation-in-part of application No. 10/104,750, filed on Mar. 22, 2002, now Pat. No. 6,637,893.

(51) Int. Cl.$^7$ ............................................. G03B 21/14
(52) U.S. Cl. .................. 353/85; 353/122; 235/455; 235/462.06; 235/462.42
(58) Field of Search .................. 353/85, 121, 122; 348/161, 370; 250/271; 235/462.06, 462.11, 462.21, 462.41, 462.42, 455

(56) References Cited

U.S. PATENT DOCUMENTS

| | | | | |
|---|---|---|---|---|
| 3,774,014 A | * | 11/1973 | Berler | 235/462.11 |
| 5,028,771 A | * | 7/1991 | Yang | 235/462.06 |
| 5,380,992 A | * | 1/1995 | Damen et al. | 235/462.25 |
| 5,679,941 A | * | 10/1997 | Iizaka et al. | 235/383 |
| 5,900,611 A | * | 5/1999 | Hecht | 235/454 |
| 5,984,186 A | * | 11/1999 | Tafoya | 235/462.24 |
| 6,010,070 A | * | 1/2000 | Mizuochi et al. | 235/455 |
| 6,065,678 A | * | 5/2000 | Li et al. | 235/462.46 |
| 6,065,839 A | | 5/2000 | Miyata et al. | |
| 6,344,874 B1 | * | 2/2002 | Helms et al. | 348/164 |
| 6,515,740 B2 | * | 2/2003 | Bamji et al. | 356/141.1 |
| 6,637,893 B2 | * | 10/2003 | Hecht | 353/85 |
| 2002/0067422 A1 | * | 6/2002 | Miura et al. | 348/370 |

* cited by examiner

Primary Examiner—William C. Dowling
(74) Attorney, Agent, or Firm—Volpe and Koenig, P.C.

(57) ABSTRACT

A presentation imaging system used for imaging machine readable information on an object is provided. The system includes an imaging device coupled to a processor. The imaging device senses the presence of an object within a field of view. A light source projects a structured beam at a first intensity to define an imaging area generally co-extensive with the field of view. Upon detection of the object, the processor signals the light source to project the beam at a second, higher intensity for imaging.

9 Claims, 2 Drawing Sheets

PRESENTATION IMAGING SYSTEM

CROSS REFERENCE TO RELATED APPLICATION

This application is a continuation-in-part of U.S. patent application Ser. No. 10/104,750, filed Mar. 22, 2002 now U.S. Pat. No. 6,637,893, which is incorporated by reference as if fully set forth.

BACKGROUND

The present application relates generally to an optical imaging system. More particularly, the invention provides a presentation imaging system for imaging and processing machine readable information on an object which is carried thereunder and which provides a visual indicator to an operator as to the imaging area and provides feedback to the operator when the machine readable information has been imaged and successfully processed.

Package monitoring capability is a vital task of modern inventory control. In many warehousing and trunk loading facilities, packages are scanned as they are loaded onto or received from trucks or other shipping means. To aid in this task, scanners have been developed. Typically, two types of scanners are used, hand-held mobile scanners and non-mobile linear scanners. Often, however, these two types of scanners have inherent limitations which affect their overall efficiency and usefulness.

Hand-held mobile scanners are used by operators to record information contained on bar code labels. These scanners come in various forms including wand, CCD, CMOS and portable laser scanners. The sensitivity of these scanners requires them to be in close proximity to the bar code to successfully read it. This direct contact/close proximity reading requires slow package movement along the material transit path to allow handlers to scan the package without errors, ultimately increasing package handling costs. An additional problem with these scanners is that they are limited in their usefulness. These scanners can only read bar code information and will not image an object based upon other characteristics.

Non-mobile linear scanning systems require precise alignment between a bar code and the scanning system. In these systems, an operator must locate a bar code on a package and then manipulate the package so that the bar code is in one of the required alignments for reading. These scanners have a greater scanning depth capability relative to hand-held scanners. However, these scanners do not allow imaging of whole surfaces of packages at one time, rather they scan one or more discrete lines while the package moves through a scanning area.

There is a need to provide an imaging system which will image objects from a remote point over a wide optical field or area while allowing accurate reading of bar codes or other machine readable information located on a surface of the object. There is a further need to provide a system which will require minimal package manipulation in order to accurately image an object and process the machine readable information, such that a user carrying an object can easily pass it through a defined imaging field as he loads or unloads the object. There is a still further need to provide a system for reading and processing machine readable information on an object that is safe and provides confirmation that successful processing of the information has occurred.

SUMMARY

The current invention provides a presentation imaging system used for reading and processing machine readable information on an object. The presentation imaging system comprises an imaging device coupled to a processor for imaging a surface of an object. The imaging device detects the presence of the object within a field of view. A light source projects a structured beam at a first intensity to define an imaging area generally co-extensive with the field of view. Upon detection of the object, the processor signals the light source to project the beam at a second, higher intensity for imaging.

BRIEF DESCRIPTION OF THE DRAWINGS

The foregoing summary as well as the following detailed description of the preferred embodiments of the invention will be better understood when read in conjunction with the appended drawings. For the purpose of illustrating the invention, a presently preferred embodiment is shown. It should be understood, however, that the invention is not limited to the precise arrangements shown. In the drawings.

DETAILED DESCRIPTION OF THE PREFERRED EMBODIMENT(S)

The ensuing detailed description provides preferred exemplary embodiments only, and is not intended to limit the scope, applicability, or configuration of the invention. Rather, the ensuing detailed description of the preferred exemplary embodiment(s) will provide those skilled in the art with an enabling description for implementing a preferred exemplary embodiment of the invention. It will be understood by those skilled in the art that various changes may be made in the function and arrangement of elements without departing from the spirit and scope of the invention.

The current invention provides a presentation imaging system 10 used to identify objects, such as packages. The system 10 is used to read machine readable information, such as bar codes, located on the surface of an object.

Figure 1:
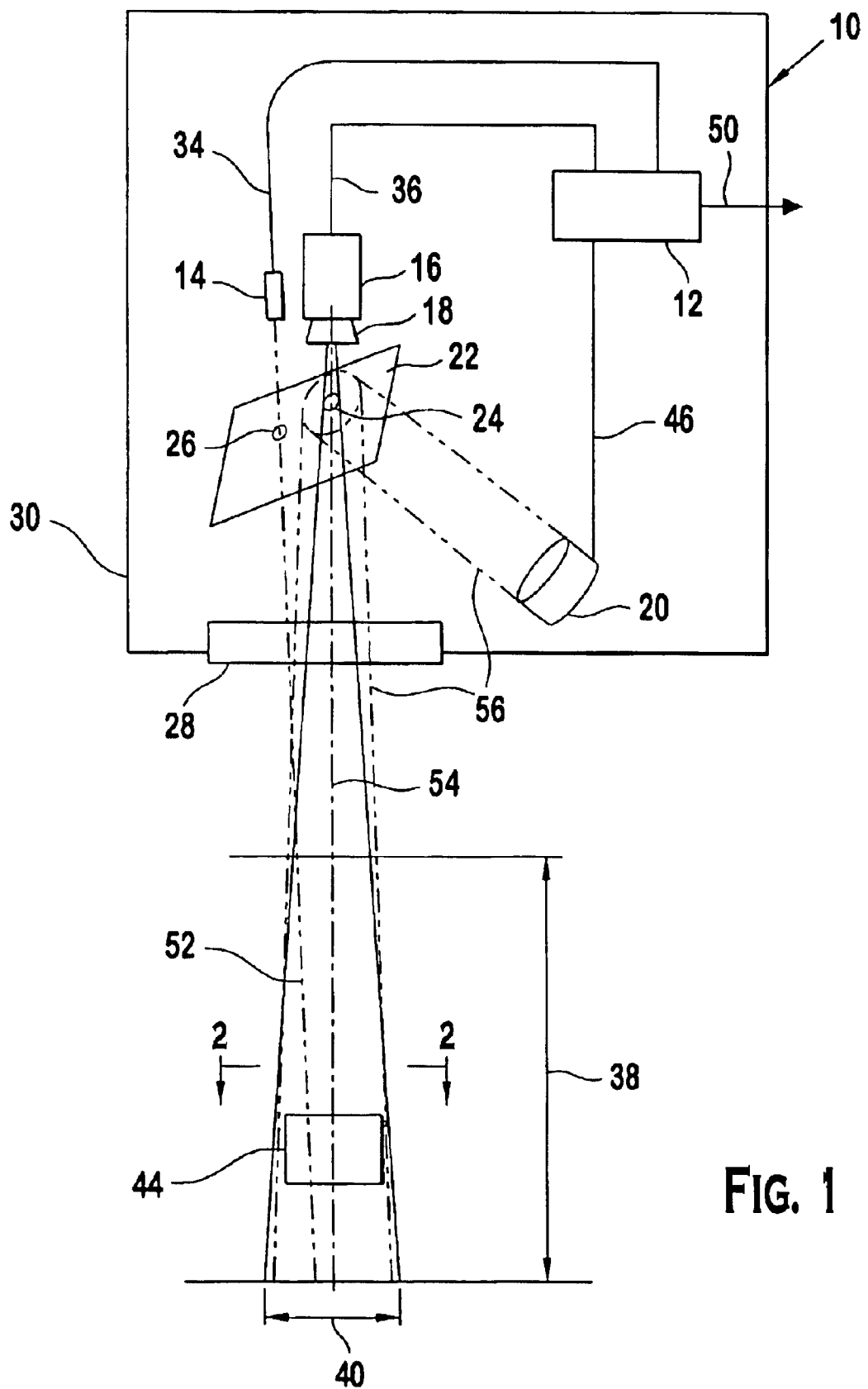
FIG. 1 is schematic view of a presentation imaging system in accordance with the preferred embodiment of the invention.

Referring to FIG. 1, the system 10 is comprised of a processor 12 connected to a sensor 14 and an imaging device 16. The imaging device 16 receives images of objects located along an observation axis 54. The imaging device 16 is preferably an area scan camera, including an area array sensor, or another similar device. Alternatively, the device 16 may include a three-dimensional image sensing apparatus which utilizes quantum efficiency modulation to provide distance measurement, for example as described in U.S. Pat. No. 6,587,186, Bamji et al., and U.S. Pat. No. 6,580,496, Bamji et al.

The sensor 14 is preferably a proximity sensor or other similar device that can detect the presence and/or the distance of an object. The processor 12 is coupled to the sensor 14 through a sensor connection 34. Alternatively, the sensor functions can be carried out by the imaging device 16 such that the sensor 14 may be omitted. For example a device 16 utilizing quantum efficiency modulation technologies would not require a separate sensor.

As shown in FIG. 1, the imaging device 16 preferably has an attached lens 18. The attached lens 18 may be either a fixed focus or auto focus type which is driven by commands from the processor 12, based on distance or position data received from the sensor 14 or the imaging device 16 for the case in which the sensing function is integral with the device 16. The automatic focus lens may be controlled by any combination of the sensor 14, the imaging device 16, and/or the processor 12 at least one of which produces range data for this purpose. For a fixed focus lens, the sensor 14 is used only to detect the presence of the object. To transfer images or image data, and sensor data if a sensor is provided with the device 16, the imaging device 16 is coupled to the processor 12 through a video connection 36.

The processor 12 captures the images obtained from the imaging device 16. Once the processor 12 captures the image, it processes the image looking for coded symbologies or other preprogrammed machine readable images or information. The processor 12 may be capable of reading different bar code information. This bar code information may include, but not be limited to, UPC, EAN, Codabar, I205, Code 39, Code 128 and/or Code 93. Additionally, the imaging device 16 and the processor 12 may be capable of performing low, medium, or high density imaging as required by the information on the objects to be scanned. Furthermore, the imaging device 16 and the processor 12 may be used for optical character recognition (OCR) or recognition of 2d symbologies. In the preferred embodiment, the system 10 has the capability of successfully imaging objects placed at a distance in excess of 5 feet from the housing opening 28.

Figure 2:
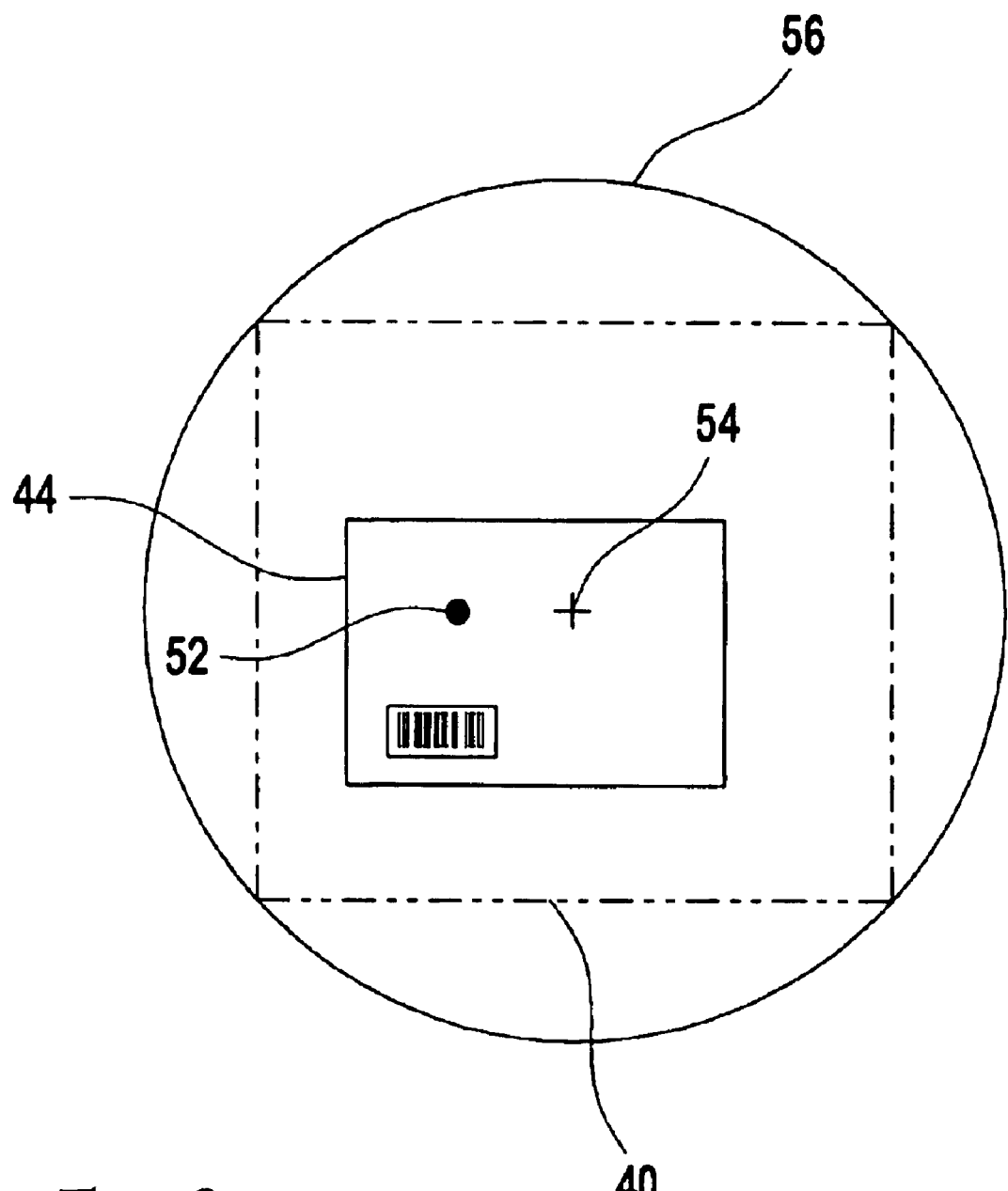
FIG. 2 is a view taken along line 2—2 in FIG. 1 which illustrates the positioning of the sensor and observation axes of the imaging area.

A light source 20 is connected to the processor 12 through a light source connection 46. The light source 20 is preferably a high intensity unit capable of providing a structured light beam 56 of sufficient lumens to an object placed at a distance from the imaging device 16. Such light sources include, but are not limited to, halogen, xenon metal halide, or other lamp units. In the preferred embodiment, the light source 20 has at least two modes of operation controlled by the processor 12. The first mode provides a low intensity illumination to clearly define an imaging area which can be easily recognized by material handlers, without a continuous high brightness that can obscure an operator's vision due to reflection from the package surface. This also allows for lower power consumption for the majority of the operating time for the system 10. In the second mode of operation, which is preferably triggered when the sensor 14 detects the presence of the object 44, the light source 20 brightly illuminates the object 44 placed in an imaging area 40, which is generally co-extensive with the structured light 56 as shown in FIG. 2, allowing the imaging device 16 to image any machine readable information on the object 44. The image passes through the lens 18 to the imaging device 16, where it is converted to an image signal that is transmitted via cable 36 to the processor 12, where it is processed looking for any preprogrammed machine readable information.

Preferably, a third mode is provided that gives a visual acknowledgment to the operator that the machine readable information on the object has been processed. This can be through having the light source 20 turn off or blink before returning to the first mode. Alternatively, other types of operator acknowledgment can be provided, such as an audio signal. Additionally, different colors of lights may be used between settings to more clearly highlight the intensity settings used. Those skilled in the art will recognize that the number and intensity of the settings may be varied.

A reflector 22 is preferably used to allow light generated by the light source 20 to be reflected along the observational axis 54, as shown in FIG. 1. The reflector 22 reflects light generated by the light source 20 through a preferred angle of 45° relative to the observation axis 54 in order to make the light from the light source 20 co-axial with the observation axis 54. As those skilled in the art will recognize, the positioning of the light source 20 and the reflector 22 may be altered to provide differing configurations. Additionally, the light source 20 may be a point source or any other type of source, and the reflector 22 could be shaped to focus the light source to produce the structured beam 56. The reflector 22 is preferably a mirror, however, other embodiments may include other similar devices. In the preferred embodiment, the reflector 22 has two openings 24, 26. A sensor opening 26 is created to allow the sensor 14 to send and receive signals down a sensor sight line 52. In a likewise manner, an imaging device opening 24 is provided to allow the imaging device 16 to obtain images through the reflector 22. Those skilled in the art will recognize that the cut-outs 24 and 26, may be of any size and geometry.

A housing 30 is provided to allow the components described above to be securely housed. Preferably, the presentation imaging system 10 is attached to a structural member in an overhead position allowing an unimpeded package imaging view. A housing window or opening 28 allows the sensor sight line 52, the imaging device field of view along the observation axis 54, as well as the structured light beam 56 to exit the housing 30.

Referring to FIGS. 1 and 2, the presentation imaging system 10 is shown imaging an object 44. The object 44 is moved into a position within the imaging area 40 which can be easily recognized by the user based on the structured beam 56 from the light source 20 illuminating the object 44. The sensor 14 detects the distance to the surface of the object 44 along the sensor sight line 52, preferably using a signal reflected back from the surface of the object 44 when the object moves into the sight line 52. In the preferred embodiment, the sight line 52 and the observation axis 54 are in close proximity or nearly co-incident within the scan range 38. As one skilled in the art will recognize, other configurations are possible including providing additional sensors to cover additional sections of the imaging area. The imaging area 40 of the imaging system 10 may be altered based upon the needs of the user and the configuration of the imaging device, but is preferably coaxial and generally co-extensive with the structured light beam 56, as shown in FIG. 2.

The sensor 14 transmits distance data to the processor 12. Upon receipt of the data, the processor 12 processes the data, provides focus information to the lens 18 of the camera 16, and intensifies the light source 20 to allow sufficient illumination of the object 44 for imaging. A feed back loop can also be programmed for distance data from the sensor 14 and the camera focusing to ensure that focusing is completed prior to imaging. The imaging device 16 is then activated by the processor 12. Reflected light from the surface of the object 44 is gathered by the imaging device 16 focused through the lens 18. The imaging device 16 then transmits the image data to the processor 12. The processor 12 processes the transmitted image and analyzes the data against preprogrammed processing requirements. If the image is successfully verified, (for example, a bar code is read) the processor 12 will provide the data to a predetermined destination, such as a host computer system, and will provide notification that a successful scan has been accomplished. As those skilled in the art will recognize this notification may include, but not be limited to, an audible alarm, winking the light source 20 off and on, changing the color of the light source 20 or other means.

While the operation of the preferred embodiment of the invention has been described in terms of an auto focus lens on the imaging device 16, those skilled in the art will recognize from the present disclosure that other options are available for providing imaging over a large depth of field without the need for physically adjusting the focus of a lens. This includes the possibility of using a cubic phase mask filter which provides for focus over a large depth of field, the use of bright lighting with a small aperture, as well as other non-moving part solutions for focusing over a large depth of field. These arrangements have the added benefit of no moving parts, which are generally the highest wear/maintenance items.

While the preferred embodiment of the invention has been described in detail, the invention is not limited to the specific embodiment described above, which should be considered as merely exemplary. Further modifications and extensions of the present invention may be developed, and all such modifications are deemed to be within the scope of the present invention as defined by the appended claims.

What is claimed is:

1. A presentation imaging system for imaging machine readable information on an object, comprising:
   a processor;
   an imaging device, coupled to the processor for detecting an object within a field of view and imaging the object; and
   a light source connected to the processor which projects a structured beam at a first intensity to define an imaging area generally co-extensive with the field of view and, upon detection of the object, the processor signals the light source to project the structured beam at a second, higher intensity.

2. The presentation imaging system of claim 1, wherein the light source has first, second and third operating modes, the first operating mode being the first intensity that has a low power consumption, the second operating mode being the second, higher intensity for imaging the object, and the third operating mode being an operator acknowledgment mode wherein the processor at least one of changes an intensity and blinks the light source off.

3. The presentation imaging system of claim 2, wherein the light intensity settings are controlled by the processor.

4. The presentation imaging system of claim 1, wherein a second color light signals notification of successful imaging of the machine readable information on the object.

5. The presentation imaging system of claim 1, further comprising an audible or visual signal generator connected to the processor which activates upon successful imaging of the machine readable information on the object.

6. The presentation imaging system of claim 1, further comprising a reflector having at least a first opening and a second opening, the first opening providing a path for the imaging device to receive images through the reflector and the second opening providing a path for a sensor to detect the object.

7. The presentation imaging system of claim 8, wherein the reflector is a mirror positioned at an angle of about 45° to the axis.

8. The presentation imaging system of claim 1, wherein the imaging device further includes a lens coupled to the imaging device which utilizes distance data provided by a sensor for automatic focusing.

9. The presentation imaging system of claim 1, wherein the imaging device includes a three-dimensional image sensing apparatus which utilizes quantum efficiency modulation to produce distance data.

* * * * *